United States Patent Office 3,634,467
Patented Jan. 11, 1972

3,634,467
1α,2α-METHYLENE-6-TRIFLUOROMETHYL STEROIDS

Wagn Ole Godtfredsen, Vaerlose, and Claus Aage Svensgaard Bretting, Copenhagen, Denmark, assignors to Lovens Kemiske Fabrik Produktionsaktieselskab, Ballerup, Denmark No Drawing. Filed June 4, 1969, Ser. No. 830,484
Claims priority, application Great Britain, June 5, 1968, 26,841/68

Int. Cl. C07c *169/32*
U.S. Cl. 260—397.4        2 Claims

ABSTRACT OF THE DISCLOSURE

This invention relates to the hitherto unknown 6-trifluoro-methyl - 1α,2α - methylene - $\Delta_{4,6}$ - pregnadien-17α-ol-3,20-dione and 17-esters thereof, having antiandrogenic effect without progestational side effect.

---

This invention relates to a new compound of the formula:

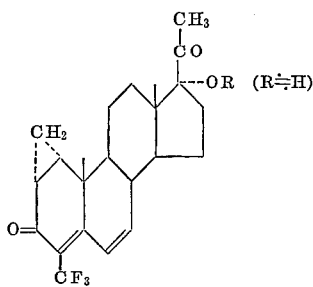

(I)

and to 17-esters thereof with therapeutically innocuous acids containing up to 12 carbon atoms. The said acid can be a mono- or poly-basic carboxylic acid, which may be aliphatic, such as acetic, propionic, valeric, caproic, enanthic, iso-butyric, or succinic acid, aromatic, such as benzoic or phenylpropionic acid, or cycloaliphatic, such as cyclopentyl-acetic acid, cyclopentyl-propionic acid, cyclohexyl-acetic acid, cyclohexylpropionic acid, bicyclo-(2.2.2)-octane - 1 - carboxylic acid or adamantane1-carboxylic acid, the acids mentioned being only illustrative of the acids which may be employed.

It is known that esters of 1α,2α-methylene-6-dehydro-17-hydroxy-progesterone have a strong progestational effect. Furthermore, it has been described in the literature that the corresponding 6-halo compounds possess antiandrogenic properties in addition to their progestational effect. It has now been found that the compound of Formula I and esters thereof have a remarkable antiandrogenic effect, without the unwanted progestational side effect. This makes them especially suitable in the treatment of certain types of virilism and hirsutism, of the Stein-Leventhal syndrome and of other diseases caused by hyperproduction of androgenic hormones. The compounds of the invention are also particularly suitable for the treatment of adolescent and premenstrual acne.

The strong antiandrogenic activity of the compounds of the invention has been demonstrated in intact and castrated male rates as well as in the cockerel test.

In the following Table I is shown the results obtained by treatment of chicks with testosterone and with testosterone mixed with 6 - trifluoromethyl-1α,2α-methylene-$\Delta^{4,6}$-pregnadiene - 17α -ol - 3,20 - dione acetate (in the table called CB 504) compared to controls treated with the same amount of the sesame oil used as solvent for the above compounds. The results of the table are the average values of the measurements of ten animals.

TABLE I

| Treatment, total dose per chick | Body weight Initial g. | Body weight Final g. | Comb weight mg. | Comb weight mg. per 100 g. B.W. |
|---|---|---|---|---|
| Controls, sesame oil | 38 | 81 | 34.7±2.08 | 42.9±2.20 |
| Testosterone, 50 μg. plus sesame oil | 37 | 86 | 76.5±7.12 | 89.6±8.18 |
| P¹ compared to controls | | | <0.001 | <0.001 |
| Testosterone, 50 μg. plus 1.0 mg. CB 504 | 36 | 84 | 59.0±4.82 | 69.7±4.66 |
| P¹ compared to controls | | | <0.001 | <0.001 |
| P¹ compared to testosterone | | | <0.1 | <0.05 |

¹ Stands for probability.

The invention also relates to a method for the production of the compound of Formula I and 17-esters thereof. This method is characterized in that a 6-trifluoromethyl-$\Delta^{1,4,6}$-steroid of Formula II below in which R represents either a hydrogen atom or an acyl radical corresponding to the acids described above, is treated with diazomethane in an inert organic solvent thereby yielding a 1,2-pyrazolino compound of Formula III below, which is subsequently recomposed, either catalytically with a strong acid such as perchloric acid, trifluoroactic acid, or p-toluenesulphonic acid in an organic solvent preferably at room temperature, or by pyrolysis, preferably in high vacuum, to yield the crude reaction product of Formula IV. This can be worked up in the usual manner known from the steroid chemistry to give the pure substance (IV) of the invention:

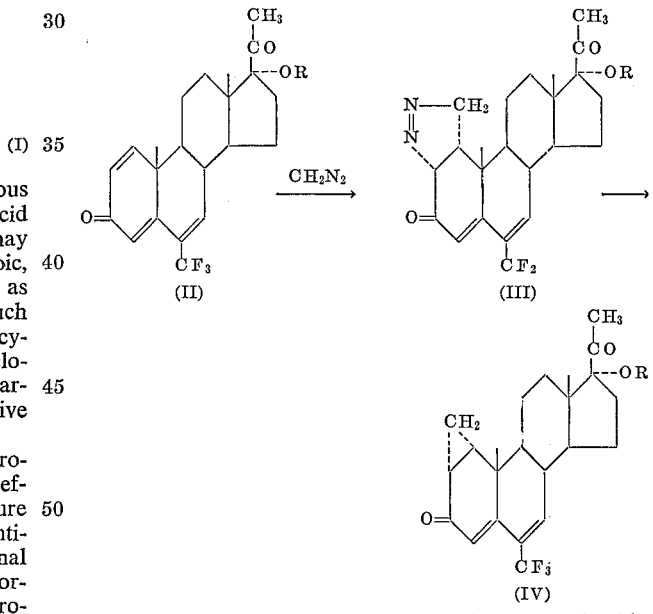

The reactions according to the invention are preferably performed with compounds having an esterified hydroxyl group in the 17-position, and the free hydroxy compound can be obtained by saponification of the esters. The starting materials of Formula II are known compounds and are described in the specification of our U.S. Pat. No. 3,222,383.

The invention will be more specifically illustrated in the following example:

EXAMPLE 6-trifluoromethyl-1α,2α-methylene-$\Delta^{4,6}$-pregnadiene-17α-ol-3-20-dione acetate (A) 6 -trifluoromethyl - $\Delta^{1,4,6}$-pregnatriene - 17α-ol-3, 20-dione acetate.—A solution of 6-trifluoromethyl - $\Delta^{4,6}$-pregnadiene - 17α-ol-3,20-dione acetate (9.0 g.), Acta. Chem. Scand. 15, 1786 (1961)), 2,3-dichloro-5,6-dicyanobenzoquinone (5.4 g.) and p-toluenesulfonic acid (8.6 g.)

in dry dioxane (350 ml.) was refluxed for 4 hours. After filtering off the dichloro-dicyanohydroquinone formed, the filtrate was diluted with methylene chloride (1000 ml.) and filtered through a column of neutral alumina (300 g.). The column was washed with methylene chloride (1000 ml.) and the combined filtrates were evaporated to dryness. The crude product was crystallized from ether-petroleum ether and recrystallized from isopropyl alcohol to give 6-trifluoromethyl-$\Delta^{1,4,6}$-pregnatriene - 17α - ol - 3,20-dione acetate; M.P. 185–187°, UV—spectrum: $\lambda_{max.}^{EtOH}$: 260 mμ (ε 13.800), $\lambda_{sh}$: 285 mμ (ε 11.500)

*Analysis.*—Calculated for $C_{24}H_{27}F_3O_4$ (percent): C, 66.04; H, 6.24. Found (percent): C, 65.89; H, 6.2.

(B) 6-trifluoromethyl-1α,2α-(4′,3′,$\Delta^{1'}$-pyrazolino)-$\Delta^{4,6}$-pregnatriene-17α-ol-3,20-dione acetate.—A solution of 6-trifluoromethyl-$\Delta^{1,4,6}$-pregnatriene-17α-ol-3,20-dione acetate (2.4 g.) in methylene chloride (30 ml.) was mixed with a solution of approximately 2.4 g. of diazomethane in 170 ml. of ether and allowed to stand in a stoppered flask for seven days at room temperature. The reaction mixture was then evaporated to dryness and the crude product purified by chromatography on silica gel using a 1:1 mixture of cyclohexane and ethyl acetate as an eluent.

After a fraction containing unreacted starting material, a fraction was collected which after two recrystallizations from methanol yielded 6-trifluoromethyl-1α,2α-(4′,3′,$\Delta^{1'}$ - pyrazolino) - $\Delta^{4,6}$ - pregnadiene-17α-ol-3,20-dione acetate; M.P. 210–212° (under decomposition and gas evolution), UV—spectrum: $\lambda_{max.}^{EtOH}$: 276 mμ (ε 22.300), $\lambda_{sh}$: 231 mμ (ε 4.500)

(C) 6-trifluoromethyl - 1α,2α - methylene-$\Delta^{4,6}$-pregnadiene-1/α-ol-3,20-dione acetate.—To a stirred solution of 0.04 ml. of perchloric acid (70%) in 4 ml. of acetone, 200 mg. of 6-trifluoromethyl-1α,2α-(4′,3′,$\Delta^{1'}$-pyrazolino)-$\Delta^{4,6}$-pregnadiene-17α-ol-3,20-dione acetate were added. A vigorous gas evolution took place, and after the reaction had subsided, stirring was continued for another 3 minutes. The reaction mixture was then poured into 25 ml. of ice-water, and the amorphous precipitate formed was extracted with methylene chloride. The organic phase was washed with water, dried and evaporated to dryness to give a crude product which was purified by chromatography on silica gel using a 1:1 mixture of cyclohexane and ethyl acetate as an eluent. Recrystallization from ether-petroleum ether gave 6-trifluoromethyl-1α,2α-methylene-$\Delta^{4,6}$-pregnadiene - 17α-ol-3,20 - dione acetate; M.P. 248–250°, UV—spectrum: $\lambda_{max.}^{EtOH}$: 269 mμ (ε 19.200)

I.R. (KBr): 1743, 1717, 1665, 1645 (shoulder) and 1600 cm.$^{-1}$. NMR (in CDCl$_3$ with TMS as internal reference): δ=0.76 (singlet) CH$_3$–18; δ=1.22 (singlet) CH$_3$–19; δ=5.96 (singlet) CH–4; δ=6.67 (singlet) CH–7.

*Analysis.*—Calculated for $C_{25}H_{29}F_3O_4$ (percent): C, 66.25; H, 6.49. Found (percent): C, 66.59; H, 6.55.

By using the isobutyrate, the benzoate, the cyclopentyl-acetate and the adamantoate as starting material instead of the acetate of 6-trifluoromethyl-$\Delta^{1,4,6}$-pregnatriene-17α-ol-3,20-dione and following the procedure described in the example, the compounds of Formula IV in which R is isobutyryl, benzoyl, cyclopentyl-acetyl and 1-adamantoyl, respectively, were obtained.

What we claim is:

1. A compound selected from the group consisting of 6 - trifluoromethyl-1α,2α-methylene-$\Delta^{4,6}$-pregnadiene-17α-ol-3,20-dione and esters thereof with carboxylic acids containing up to 12 carbon atoms.

2. 6 - trifluoromethyl-1α,2α-methylene-$\Delta^{4,6}$-pregnadiene-17α-ol-3,20-dione acetate.

References Cited

UNITED STATES PATENTS 3,198,792  8/1965  Reerink et al. ____ 260—397.45
3,504,087  3/1970  Irmscher et al. ____ 260—397.4

ELBERT L. ROBERTS, Primary Examiner

U.S. Cl. X.R.

260—239.5